United States Patent [19]
Warmann

[11] 4,084,770
[45] Apr. 18, 1978

[54] PNEUMATIC TUBE CONVEYOR DISPATCHER

[76] Inventor: Bruno D. Warmann, 15362 Fairlane Dr., Livonia, Mich. 48154

[21] Appl. No.: 775,257

[22] Filed: Mar. 7, 1977

[51] Int. Cl.² .......................................... B65G 51/28
[52] U.S. Cl. ....................................... 243/25; 243/28
[58] Field of Search .................. 243/1, 19, 25–28, 243/38; 302/2 R, 11

[56] References Cited

U.S. PATENT DOCUMENTS

| 3,237,883 | 3/1966 | Thorburn et al. | 243/25 |
| 3,404,921 | 10/1968 | Vergales et al. | 302/2 R |
| 3,767,138 | 10/1973 | Martin | 243/28 |
| 3,998,405 | 12/1976 | Carlier | 243/28 |

FOREIGN PATENT DOCUMENTS 1,333,596   10/1973   United Kingdom ................ 243/1

Primary Examiner—John J. Love
Assistant Examiner—Jeffrey V. Nase
Attorney, Agent, or Firm—Basile and Weintraub

[57] ABSTRACT

A pneumatic tube conveyor dispatcher for converting a pneumatic tube free dispatch system into a pneumatic tube controlled dispatch system. The dispatcher comprises a housing having a rear portion which matingly engages an existing terminal of the free dispatch system such that a carrier storage chamber within the dispatcher housing communicates with the inlet opening of the delivery tube of the free dispatch system. The dispatcher housing includes a door permitting access to the carrier chamber to enable an operator to position a carrier therein. Sensing means associated with the housing chamber senses the presence of the carrier and, in response to a predetermined signal, is operative to actuate a drive mechanism which delivers the carrier through the terminal inlet opening into the pneumatic tube for deployment.

6 Claims, 6 Drawing Figures

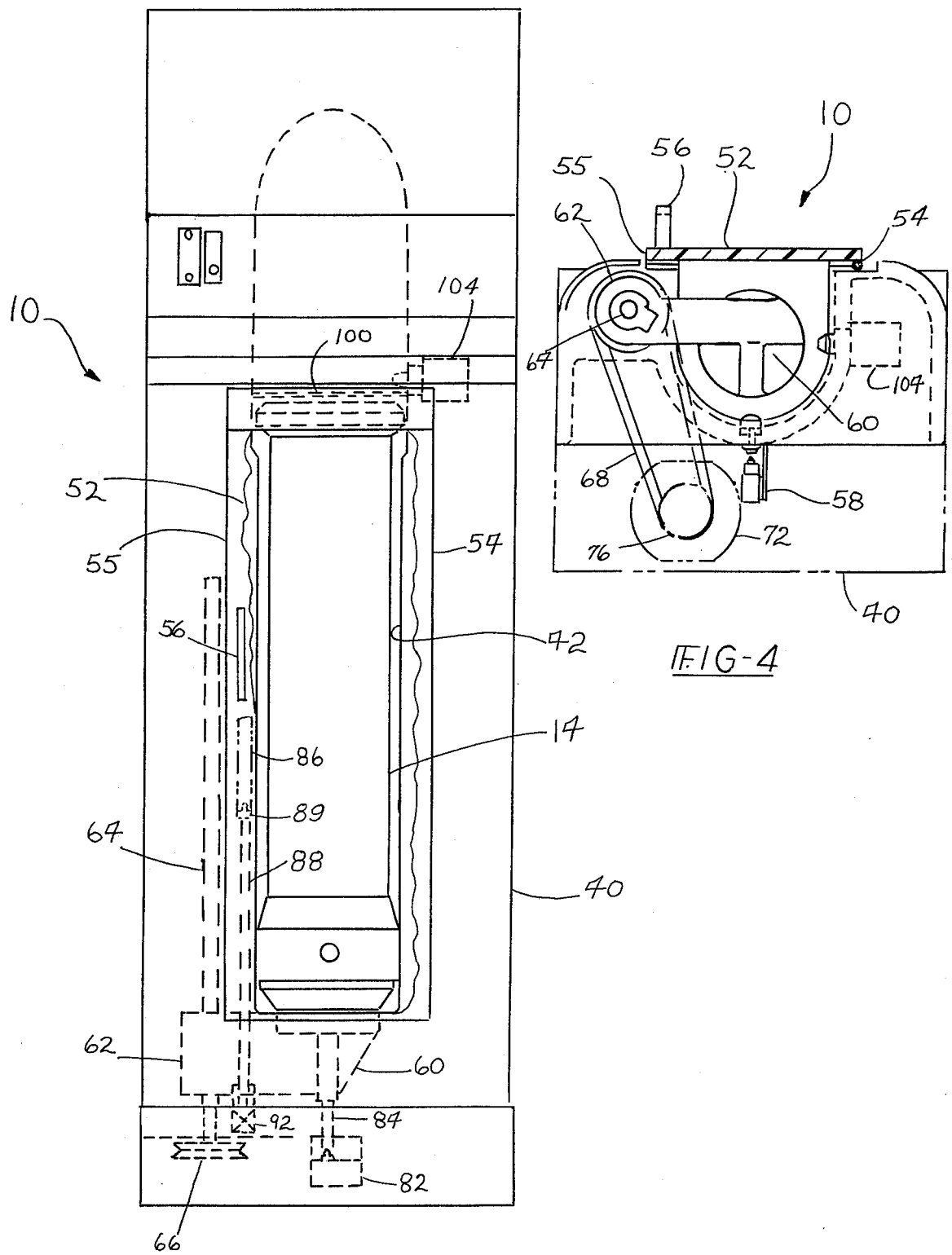

PNEUMATIC TUBE CONVEYOR DISPATCHER

BACKGROUND OF THE INVENTION

I. Field of the Invention

The present invention relates to pneumatic tube conveyor systems and, in particular, to a unique means for converting a free dispatch pneumatic tube conveyor system into a controlled dispatch system.

II. Description of the Prior Art

In the most elementary tube conveyor systems a carrier is conveyed pneumatically directly from a dispatch terminal to a discharge terminal through one conveyor tube and is returned through another, the two tubes comprising a continuous air circuit. Since such a system was cumbersome and generally wasteful of material, conveyor systems evolved from the simple point-to-point conveying system to the fully automated computer controlled systems that are commercially available today. With the advent of the ring dial carriers and the magnetic dial carriers, the full potential of automation had been realized. The simple point-to-point tube lines were replaced by pairs of tube lines, each pair having the capacity to serve up to ten stations. The routing and switching of the carriers was accomplished electronically by reading the designation address selected on the body of the carrier. All sending inlets of the system were tied to one common tube line, while the receiving outlets were tied to another tube line. The two tube lines constituted the pair previously mentioned. To dispatch a carrier, it was necessary for an operator to open the sending inlet door and insert the carrier directly into the tube line. This method, while extremely simple, had serious disadvantages insofar that the operators had a tendency to insert several carriers, one after the other, into the tube line and, thus, overload the same. It is also known that the operators would insert carriers backwards into the system which made it impossible for proper routing, as such proper routing cannot be accomplished when the carrier is inserted in a rearward manner. Such rearward insertion of the carrier into the tube could also damage the carrier and the system. It is also known that operators have inserted foreign materials, such as paper, pencils, bottles and the like, into the system, all of which contribute to malfunctions in the system, as well as system shutdowns.

In certain situations operators are required to hold the sending inlet door open for a certain time after inserting the carrier. This can be a very difficult requirement to meet, as many operators will normally insert the carrier within the tube and immediately close the door. If a sufficient amount of time does not pass after the door has been held open, the carrier will stall in the tube line and will have to be retrieved at a later date. If, on the other hand, the door is held open for too long a period, the sending tube line can become disabled. Many of these problems have been recognized by pneumatic tube manufacturers; and to compensate, the manufacturers have introduced the so-called "Controlled Inlet Type" of system, which is commonly referred to as "Controlled Dispatch." In the controlled dispatch system the operator does not have direct access to the sending tube line, but instead there is a motorized valve called a slide gauge which functions as a barrier to prevent the carrier from being directly inserted within the tube lines. Carriers cannot be dispatched backwards, nor can foreign material be inserted into the system. The carriers that are properly positioned in the controlled dispatch mechanisms are dispatched in an orderly sequence as determined by a control center. Unfortunately, solutions to the prior art problems and the improvements brought by the controlled dispatch system benefit only users who have bought such systems during the initial construction of the building that utilizes the controlled dispatch conveyor system. To convert the free dispatch system to a controlled dispatch system requires extensive and costly rework of the existing equipment and facilities. Old stations must be replaced with new stations, while tube lines must be rerouted, necessitating the removal of walls, ceilings and the like and their reconstruction. Since the controlled dispatch station is considerably longer than the free dispatch station, there are numerous problems with masonry that may not always be solved to the owner's satisfaction. It would therefore be desirable to provide a simple and inexpensive means for converting a free dispatch system to a controlled dispatch system.

SUMMARY OF THE INVENTION

The present invention, which will be described subsequently in greater detail, comprises a dispatcher for converting a free dispatch pneumatic tube conveyor system to a controlled dispatch pneumatic tube conveyor system. The dispatcher comprises a housing mounted to the inlet opening of each sending station in the system. The housing includes a carrier chamber in which an operator positions a carrier desired to be injected into the pneumatic system. The housing includes drive means operable upon actuation for delivering the carrier through the inlet opening and into the pneumatic tube. Suitable sensing means, responsive to the presence of the carrier within the chamber and the number of carriers within the tube, are operable to actuate the drive means to commence delivery of the carrier into the tube.

It is therefore a primary object of the present invention to provide a means whereby a free dispatch pneumatic tube conveyor system may be converted to a controlled dispatch system without the need for extensive modification to the existing facility, the same being accomplished in a simple and economic fashion which is substantially less expensive than converting a free dispatch system into a controlled dispatch system of conventional design.

It is a further object of the present invention to provide a means for converting a free dispatch system into a controlled dispatch system which may be done on a step-by-step basis, thus, minimizing the need for capital investment at any given point whereby a portion of the system may be of a controlled, dispatched nature, while other portions of the system may be of the free dispatch nature.

It is a further object of the present invention to provide a means for converting a free dispatch system to a controlled dispatch system which may be accomplished without the need for disrupting service of the existing free dispatch system and without the need for any modifications to the existing building housing the free dispatch system.

Other objects, advantages and applications of the present invention will become apparent to those skilled in the art of pneumatic tube conveyor dispatchers when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a front plan view of the pneumatic tube conveyor dispatcher with portions thereof removed for clarity and as seen in the direction of the arrow 3 in FIG. 2;

FIG. 4 is a cross-sectional view of the pneumatic tube conveyor dispatcher taken along Line 4—4 of FIG. 2;

DESCRIPTION OF THE PREFERRED EMBODIMENT

Figure 5:
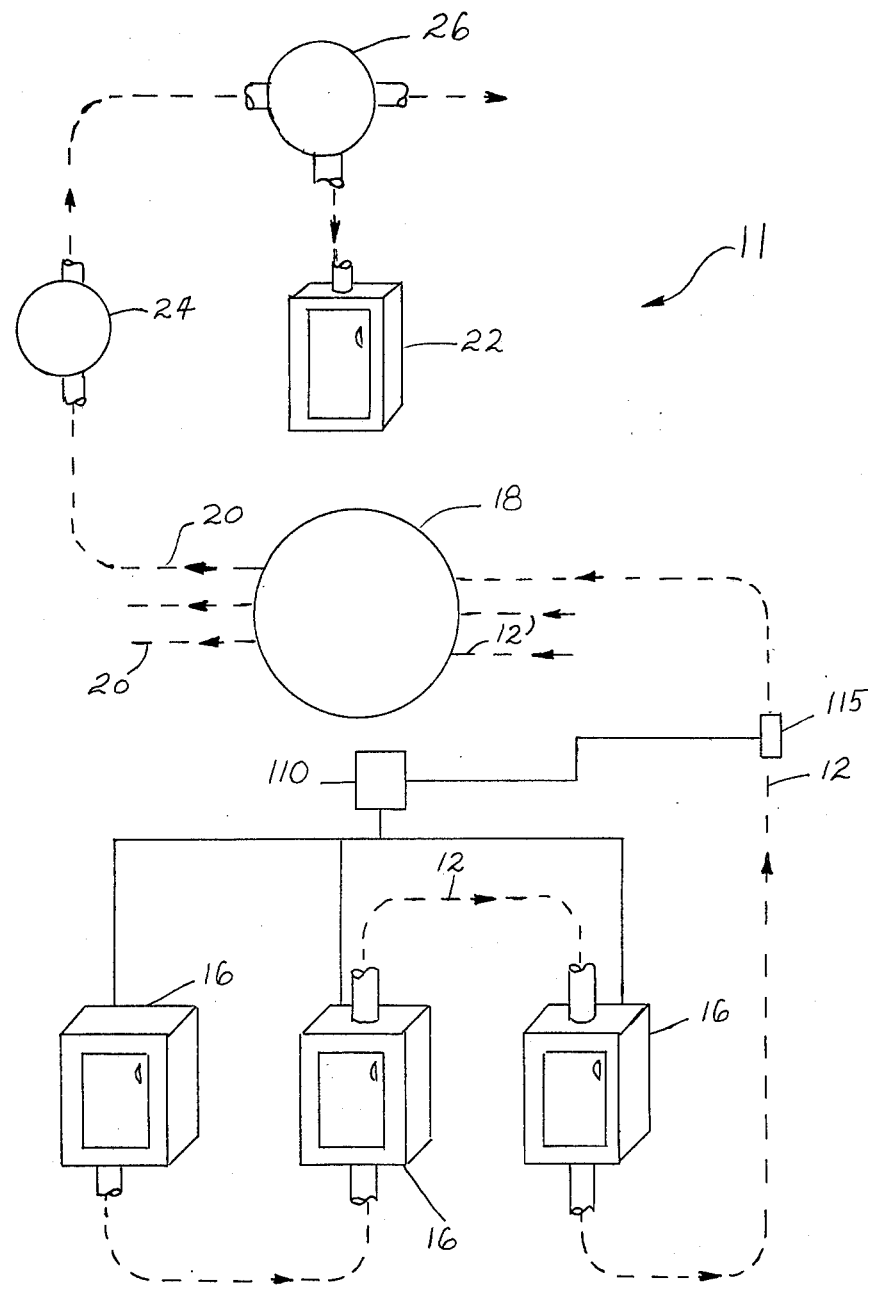
FIG. 5 is a schematic illustration of a free dispatch system which will employ the inventive pneumatic tube conveyor dispatcher illustrated in FIGS. 1 through 4 of the drawings.

Referring now to the drawings and, in particular, to FIGS. 1 through 4 wherein there is illustrated one example of the present invention in the form of a pneumatic tube conveyor dispatcher 10 for converting a free dispatch system to a controlled dispatch system. Referring momentarily to FIG. 5, it can be seen that the pneumatic tube conveyor system 11 comprises a plurality of delivery tubes 12 through which carriers 14 (FIG. 1) move from sending terminals 16 to an exchanger or transfer station 18. The exchanger or transfer station 18 is associated with one or more discharge tubes 20 of the system from which the carrier 14 passing therethrough may be directed to a receiving terminal 22. When carriers 14 of the magnetic or ring dial type are utilized, a brush or magnetic selector 24 is adapted to scan the carrier and send a signal to an appropriate deflector switch 26 which will direct the carrier 14 to the appropriate receiving terminal 22.

Figure 1:
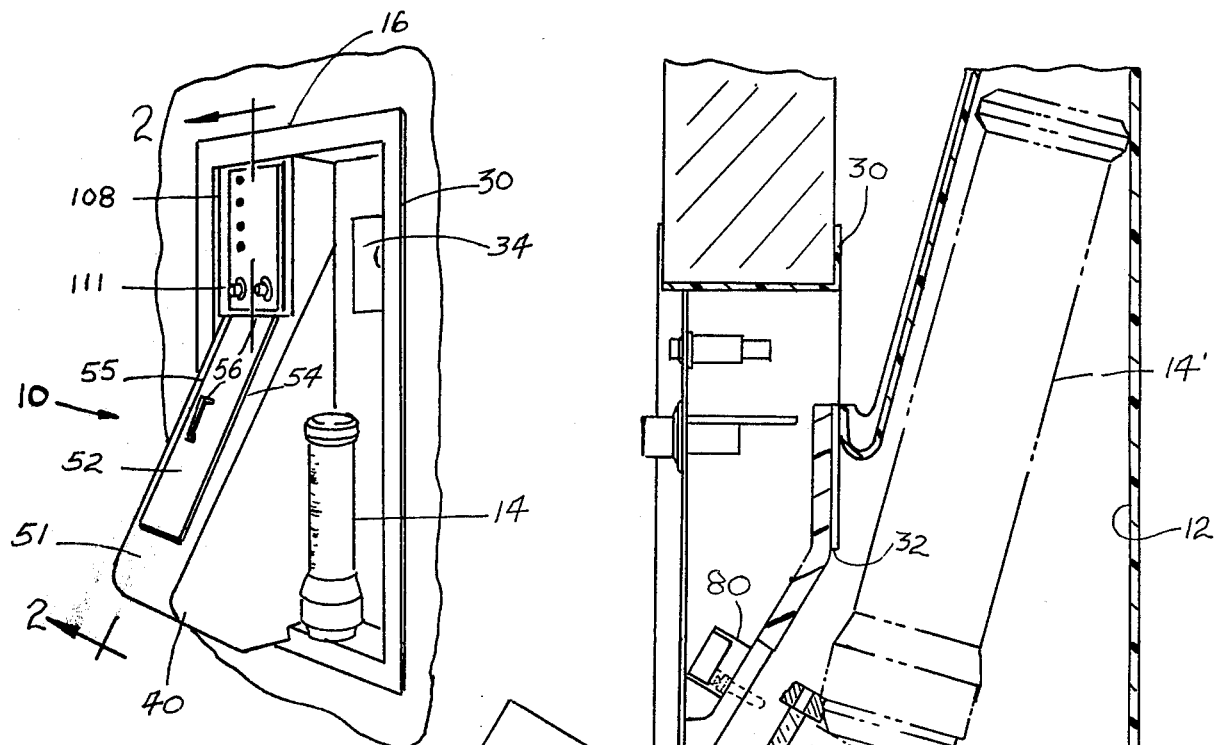
FIG. 1 is a perspective view of a pneumatic tube conveyor dispatcher constructed in accordance with the principles of the present invention.

FIG. 1 illustrates the mounting of the inventive dispatcher 10 to the frame 30 of the station terminal 16 which has been modified to receive the dispatcher 10. The station terminal 16 is modified in that it previously consisted of two doors, one of which is not shown, and was adapted to cover the inlet opening 32 (FIG. 2) through which the carrier 14 was inserted for delivery into a conveyor tube 12. Adjacent the opening 32 a second door 34 provides access to the discharge tube 20 (FIG. 5) and functions as the receiving terminal 22 of the system 11. In the preferred embodiment of the invention the frame 30 of the station terminal 16 is modified by removing the door associated with the inlet opening 32 and by mounting the dispatcher 10 to the frame 30 such that it is aligned with the inlet opening 32 in a manner which will be described hereinafter.

Figure 2:
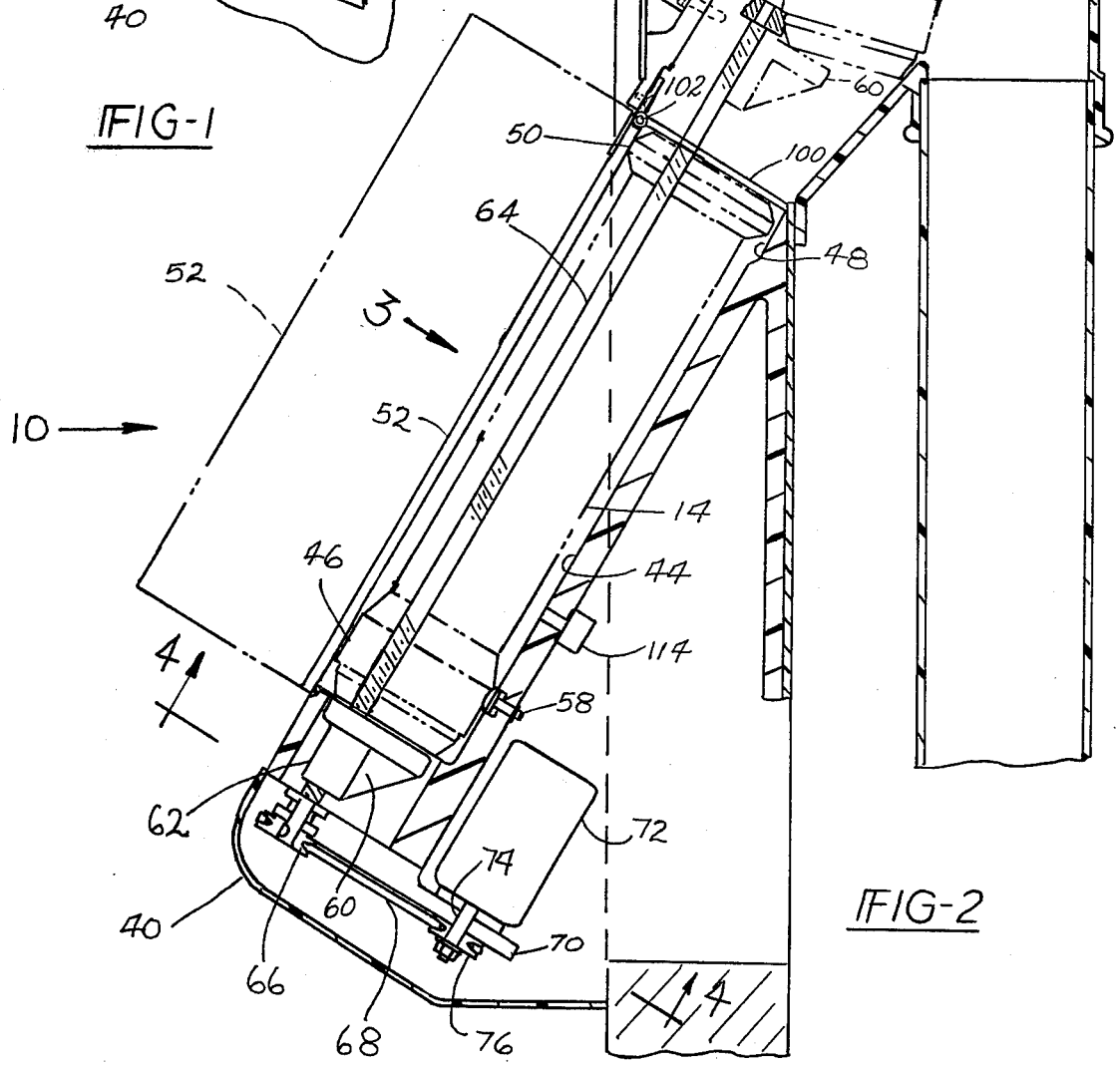
FIG. 2 is an enlarged fragmentary cross-sectional view of the pneumatic tube conveyor dispatcher taken along Line 2—2 of FIG. 1.

As can best be seen in FIGS. 1 and 2 of the drawings, the dispatcher 10 comprises an angled housing 40 having a carrier chamber 42 which is aligned with the frame inlet opening 32 of the station terminal 16 when the housing 40 is attached to the terminal frame 30 in the aforementioned manner. Actual securement of the housing 40 to the terminal frame 30 may be accomplished by any of a plurality of suitable fastening techniques, such as bolts extending through the frame, adhesives or the like, none of which are shown.

The carrier chamber 42 is shaped such that along a substantial portion of its length, its inner diameter, as indicated by the numeral 44, corresponds to the outer diameter of an enlarged lower portion 46 of the carrier 14. The upper portion 48 of the carrier chamber 42 has an enlarged diameter which corresponds to the outer diameter of the forward end 50 of the carrier 14. It can thus be seen that when the operator desires to position a carrier 14 within the carrier chamber 42, the shape of the chamber 14 is such that the operator must insert the carrier 42 with its forward end facing upward thereby completely eliminating the aforementioned problems with the prior art apparatuses wherein carriers were inadvertently inserted backwardly into the air tube.

The outer face 51 of the housing 40 mounts an access door 52 which has one lengthwise edge 54 (FIG. 4) hinged to the housing 40 such that the operator may grasp the handle 56 of the door 52 and open the same to obtain access to the carrier chamber 42 so as to position a carrier 14 therein.

It should be noted that the lower rear portion of the carrier chamber 42 mounts a sensing switch 58 which is actuated when the carrier 14 is positioned within the carrier chamber 42. The sensing switch 58 may be a button-type switch, as illustrated, or any other suitable switch which is activated in response to the proper positioning of the carrier 14 within the carrier chamber 42. As will be described hereinafter, the dispatcher 10 is operable only upon receipt of a signal from the sensing switch 58 which indicates that a carrier 14 is in position. A door operated switch (not shown in the drawing) indicates that the door is closed.

When the carrier 14 is positioned within the carrier chamber 42, the bottom of the carrier 14 is seated on a support bracket 60. The support bracket 60 has an arm member that extends laterally outwardly and defines a ball-screw arrangement 62 which receives a screw shaft 64 that is disposed in an upright position. The bottom portion of the screw shaft 64 carries a pulley 66 which is rotatably driven by drive belt 68. The housing 40 further includes a flange 70 which supports an electric motor 72, the drive shaft 74 of which is attached to drive pulley 76, which in turn mounts the drive belt 68. It can thus be seen that when the electric motor 72 is actuated in a first direction, the drive belt arrangement will rotate the shaft screw 64 so as to cause the support bracket 60 to be elevated within the carrier chamber 42. It can thus be seen that as the bracket 60 is elevated, the carrier 14 resting thereon will be moved upwardly through the inlet opening 32 of the terminal frame 30 and into the conveyor tube 12, as indicated in FIG. 2 by the phantom lines 14'. A limit switch 80, disposed at the upper regions of the carrier chamber 42, is actuated when the support bracket 60 engages the same at the outer limit of its upward travel. Upon actuation of the limit switch 80, the electric motor 72 is reversed causing the bracket 60 to be lowered back to its original position. As can been seen in FIG. 3, the lower portion of the housing 40 mounts a second limit switch 82 (FIG. 3) which is engaged by a projection 84 at the bottom of the support bracket 60 to limit the downward movement of the support bracket 60 by both deactivating the electric motor 72 and reversing the same such that upon the transmission of a further signal, as will be described hereinafter, the electric motor may be activated so as to elevate the support bracket 60 and transfer a second carrier 14 from the carrier chamber 42 to within the conveyor tube 12.

The inside surface of the access door 52 is provided with an L-shaped member that has one leg 86 attached to the inner wall of the door, while its other leg 89 projects outwardly and into the carrier chamber 42 when the access door 52 is in the closed position. The leg 89 has a locking aperture (not shown). The housing 40 further mounts a locking rod or post 88 which is slidably mounted adjacent the door edge 55 and is normally biased upwardly toward engagement with the locking aperture in the leg 89 by means of a spring member 92 disposed at the bottom portion of the locking rod 88. As can be seen in FIG. 3, the lower portion of the support bracket 60 engages the bottom of the locking post 88 such that when the support bracket 60 is in its lowered position, it exerts a force on the locking post 88, lowering the same out of engagement with the locking aperture of leg 89. After the motor 72 has been actuated so as to elevate the support bracket 60, the spring 92 will shift the locking member 88 upwardly into engagement with the locking leg 89. This ensures that the access door 52 remains securely locked during the time the support bracket 60 is driven across the carrier chamber 42 for purposes of discharging the carrier 14 into the conveyor tube 12. It can also be seen that the access door 52 will remain locked until the carrier support bracket 60 returns to its initial position and engages the lower portion of the locking post 88 to move the same downwardly against the bias of the spring 92 to disengage the upper portion of the locking post from the leg member 89.

A tube access door 100 is pivotally hinged at 102 to the upper portion 48 of the carrier chamber 42. It can be seen upon an inspection of FIG. 2 that, as the carrier 14 is moved upwardly under the power of the carrier support bracket 60, the upper edge of the carrier 14 will engage the tube access door 100, and the same will pivot about its hinge 102 as the carrier 14 moves thereby. As can best be seen in FIGS. 3 and 4, a solenoid actuated door locking mechanism 104 is mounted to the housing 40 and normally projects above the tube access door 100 to prevent its opening. The solenoid operated mechanism 104 is operated in time relationship to the actuation of the motor 72 so as to permit the access door 100 to open as the carrier 14 is moved thereby under the force of the elevating support bracket 60. It can, however, be seen that the solenoid operated door lock release mechanism 104 will prevent parties from opening the access door 100 and placing undesirable material into the tube 12. It also prevents the operators from bypassing the system and prevents them from inserting carriers 14 at an uncontrolled rate through the dispatcher 10 and into the tube 12. It can thus be seen that a carrier 14 may be inserted into the conveyor tube 12 only upon the control and actuation of the dispatcher 10.

The upper portion of the dispatcher housing 40 mounts an electrical control box 108 which may include the necessary electrical components and elements as described hereinafter for starting the dispatcher 10 and for feeding in the end location where the carrier 14 is desired to be dispatched.

Figure 6:
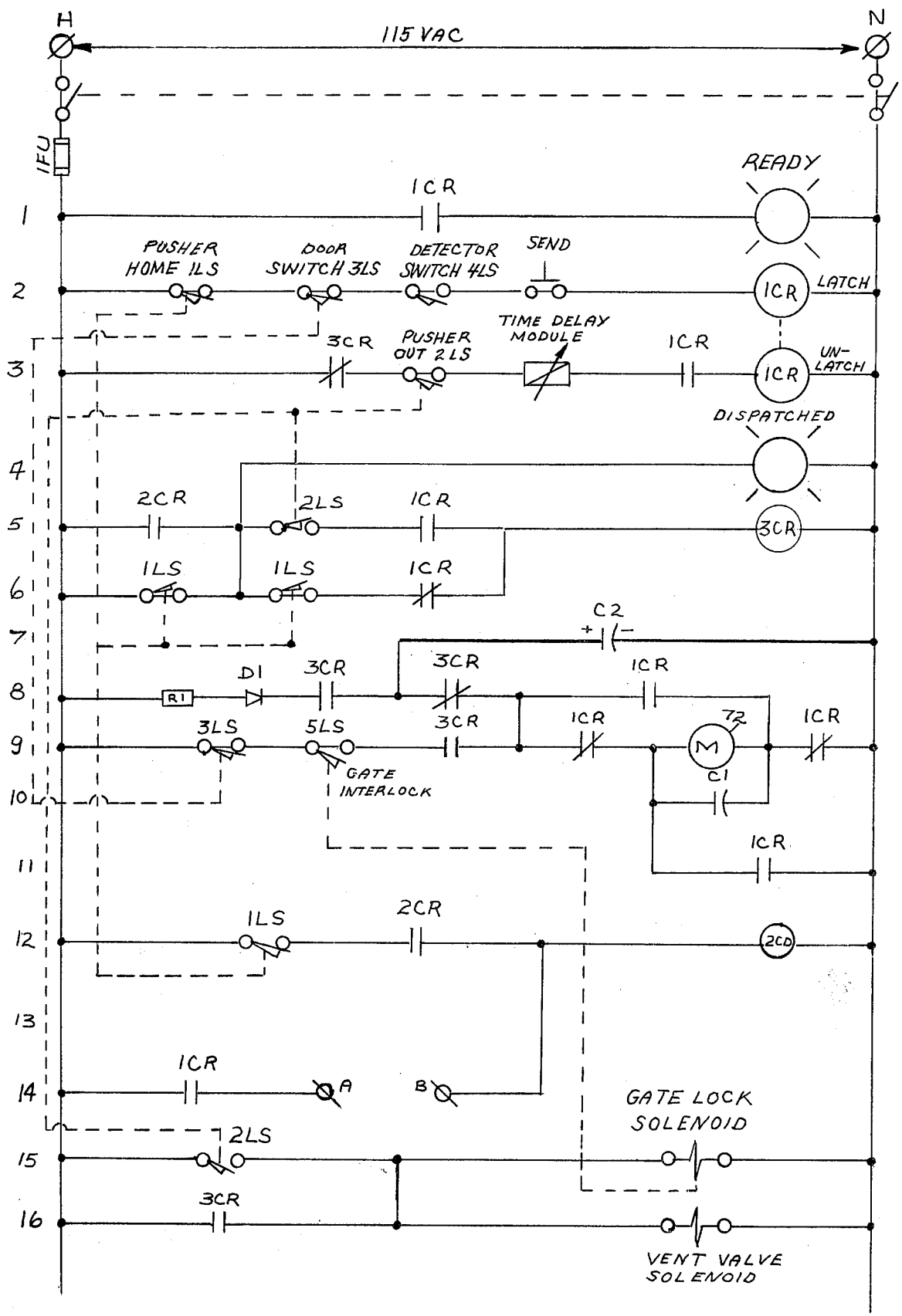
FIG. 6 is a schematic diagram of the electrical circuit employed with the pneumatic tube conveyor dispatcher illustrated in FIGS. 1 through 5 of the drawings.

Referring now to the several figures and including FIGS. 5 and 6, during use when it is desired to dispatch a carrier 14, the operator places the carrier 14 within the carrier chamber 42 and closes the access door 52. Positioning the carrier 14 within the carrier chamber 42 actuates the detector limit switch (58) 4LS shown in Line 2 of FIG. 6. When the sending inlet door 52 is closed by the operator and the send push button 111 is depressed, relay 1CR (Line 2) latches. Contacts of relay 1CR perform the following functions:

1. Line 14 - apply power to terminal A signaling to the master control panel 110 that carrier 14 is ready for dispatch.

2. Lines 8, 9 and 11 - connect motor 72 for clockwise rotation and elevation of the support bracket 60.

3. Lines 5 and 6 - transfer connection of relay 3CR from the pusher home limit switch 1LS (82) to the pusher out limit switch 2LS (80).

At the proper time the master control panel 110 applies a pulse to terminal B energizing relay 2CR which latches by means of its own contacts (Line 12) and the pusher home limit switch 1LS. The contacts of relay 2CR (Line 5) energize relay 3CR. The contacts of relay 3CR perform the following functions:

1. Line 16 - energize the gate lock solenoid 104 and the station vent solenoid 114 (FIG. 2) when one is provided to vent the chamber 42.

2. Line 8 - transfer the connection of capacitor C2 from the motor 72 to power to charge it. Capacitor C2 is used for dynamic breaking of the motor 72.

3. Line 9 - apply power to motor 72.

4. Line 3 - open circuit to the unlatched coil of relay 1CR, thus preventing resetting until relay 3CR is reset.

As soon as the support bracket 60 leaves its initial lower position, as illustrated in FIG. 2 of the drawings, the support bracket 60 releases the pusher home limit switch 1LS (limit switch 82). Contacts of the 1LS limit switch (Line 6) provide a holding circuit to relay 3CR, while contacts of the limit switch 1LS (Line 12) open the energizing relay 2CR.

When the support bracket 60 reaches the end of the travel position at the end of the chamber 42, it operates the pusher out limit switch 2LS (80). Limit switch 2LS performs the following functions:

1. Line 15 - maintains the gate lock solenoid 104 and the station vent solenoid (when provided) energized.

2. Line 5 - opens the circuit and de-energizes relay 3CR.

3. Line 3 - closes circuit in preparation for unlatching relay 1CR.

When relay 3CR de-energizes, its contacts perform the following functions:

1. Line 9 - open the circuit removing power from the motor 72.

2. Line 8 - disconnect capacitor C2 from power and connect it to the motor 72. The DC current discharged from the capacitor C2 on to the motor 72 provides the power needed for dynamic breaking. The motor 72 comes to a stop within a 180° of rotation, which is equivalent to 15 milliseconds at 2000 RPM.

3. Line 3 - close the circuit to relay 1CR which unlatches. This circuit is provided to delay switching contacts of relay 1CR (Lines 8, 9 and 11) until the motor 72 has come to a full stop.

When relay 1CR unlatches, its contacts perform the following functions:

1. Lines 5 and 6 - transfer connection of relay 3CR from the pusher out limit switch 2LS (80) to the pusher home limit switch 1LS (82), which is now closed. Relay 3CR energizes again.

2. Lines 8, 9 and 10 - change connection of motor 72 for the counterclockwise rotation and the return motion of the support member 60.

3. Line 14 - remove power from terminal A signaling to the master control panel 110 that carrier 14 has been dispatched.

Contacts of relay 3CR perform the following functions:

1. Line 16 - maintain the gate lock solenoid 104 and the station vent solenoid 114 (when provided) energized. Limit switch 2LS opens as soon as the support member 68 begins to move toward the home position, that is, the initial position at the bottom of the chamber 42, as illustrated in FIG. 2 of the drawings.

2. Line 8 - transfer connection of capacitor C2 from motor 72 to power to charge it.

3. Line 9 - supply power to motor 72.

When the support bracket 60 reaches the home position, that is, its initial position at the bottom of the chamber 42, the support bracket 60 operates the pusher home limit switch 1LS (82). Since relay 1CR is unlatched, its contacts (Line 5) are now open; and relay 3CR deenergizes. The contacts of relay 3CR (line 9) open the circuit to motor 72, while those on Line 8 transfer the connection of capacitor C2 from power to the motor 72, applying dynamic breaking.

On Line 9 the gate interlock limit switch 5LS is illustrated. This limit switch is actuated by the plunger of the gate lock solenoid 104 and is provided as a safety interlock to prevent jamming the carrier or the support bracket 60 in the event of a solenoid malfunction.

It should be noted that stations that merge into the main tube line via a branch line must be vented to provide the needed air flow for propelling the carrier 14. These stations are provided with a dispatching mechanism equipped with a solenoid operated vent valve 114 and a time delay module TDM. The time delay module is adjustable, typically between 1 and 20 seconds. When the support bracket 60 reaches the far side and operates the pusher out limit switch (80) 2LS, relay 1CR is delayed to unlatch by the setting of the time delay module TDM. During the delay period, the branch line is vented and the carrier 14 is propelled toward the main tube line. When the time delay has elapsed, the relay 1CR is unlatched and the support bracket 60 returns to its home position at the bottom of the chamber 42. Relay 1CR is of the latching type so as to insure that in the event of a power failure the controls will remember their setting, and proper sequence will be resumed once the power is restored.

A detector 115 in the tube 12 detects passage of carriers in the system and supplies this information to the panel 110.

It can thus be seen that the present invention provides a new and improved dispatcher for pneumatic tube conveyors for simply and economically converting a free dispatch system to a controlled dispatch system. It should be understood by those skilled in the art of such conveyor systems that other forms of applicant's invention may be had, all coming within the spirit of the present invention and scope of the appended claims.

What is claimed is as follows:

1. A pneumatic tube conveyor dispatcher for converting a free dispatch system to a controlled dispatch system and wherein the free dispatch system has an inlet opening through which a carrier may be inserted for passage into the delivery tube of the pneumatic system, said pneumatic tube conveyor dispatcher comprising:

a housing having a non-movable storage chamber for the receipt of said carrier, said housing having means for mounting said housing to said inlet opening such that said storage chamber communicates with said inlet opening and said storage chamber is not movable with respect to said inlet opening;

a door carried by said housing to permit access to said storage chamber to deposit said carrier therein;

sensing means associates with said storage chamber for sensing the presence of a carrier therein;

drive means responsive upon actuation for acting on said carrier to eject said carrier from said storage chamber through said inlet opening and into said tube; and actuating means operable in response to said sensing means for actuating said drive means.

2. The pneumatic tube conveyor dispatcher defined in claim 1 wherein said drive means comprising: a bottom wall supporting said carrier and an electric motor having means operatively connecting said electric motor to said bottom wall to drive said bottom wall upwardly toward said opening;

said actuating means actuating said electric motor to move said bottom wall toward said opening; and means associated with said opening for sensing the presence of said bottom wall, said last-mentioned means functioning to reverse the direction of rotation of said motor to return said bottom wall to its initial starting position.

3. The pneumatic tube conveyor dispatcher defined in claim 1 comprising:

means associated with said opening for sensing when said carrier has been dispatched from said storage chamber into said tube, said last-mentioned means being operative to reverse said drive means to return said drive means to its initial starting position; and means associated with said initial starting position to sense the return of said drive means thereto.

4. The pneumatic tube conveyor dispatcher defined in claim 3 comprising:

means associated with said access door for locking said access door when said drive means is actuated, said last-mentioned locking means being operable to unlock said door when said drive means is returned to its initial starting position.

5. The pneumatic tube conveyor dispatcher defined in claim 3 further comprising:

an inlet opening access door disposed at the upper portion of said storage chamber; and solenoid operated means engaging said door to maintain said door in a closed position, said solenoid operated means being actuated when said drive means is actuated so as to permit said access door to be opened under the pressure of engagement by said carrier as said carrier moves from said storage chamber through said inlet opening.

6. A pneumatic tube conveyor dispatcher for converting a free dispatch system to a controlled dispatch system and wherein the free dispatch system has an inlet opening through which a carrier may be inserted for passage into the delivery tube of the pneumatic system, said pneumatic tube conveyor dispatcher comprising:

a housing having a storage chamber for the receipt of said carrier, said housing having means for mounting said housing to said inlet opening such that said storage chamber communicates with said inlet opening;

a door carried by said housing to permit access to said storage chamber to deposit said carrier therein;
sensing means associates with said storage chamber for sensing the presence of a carrier therein;
drive means responsive upon actuation for delivering said carrier from said storage chamber through said inlet opening into said tube;
actuating means operable in response to said sensing means for actuating said drive means;
an inlet opening access door disposed at the upper portion of said storage chamber; and
solenoid operated means engaging said door to maintain said door in a closed position, said solenoid operated means being actuated when said drive means is actuated so as to permit said access door to be opened under the pressure of engagement by said carrier as said carrier moves from said storage chamber through said inlet opening.

* * * * *